Oct. 11, 1938.  C. L. DECKARD  2,132,781

POLISHED ROD GRIP

Filed June 12, 1937

Charles L. Deckard
INVENTOR

BY James R. Cole
ATTORNEY

Patented Oct. 11, 1938

2,132,781

UNITED STATES PATENT OFFICE 2,132,781

POLISHED ROD GRIP

Charles L. Deckard, Tulsa, Okla.

Application June 12, 1937, Serial No. 147,824

3 Claims. (Cl. 24—249)

My invention relates to new and useful inventions in polished rod grips for gripping and holding a polished rod such as the polished rod of a string of sucker rods used in pumping an oil well; and has for its objects; to provide a grip or clamp wherein the rod is gripped with a compound leverage in manner such that but a slight loosening of the bolt or tightening means will permit the jaws of the grip to fully open; to provide means for automatically opening the jaws of the grip when the clamping means is released; to provide a gate on the opposite side of the jaws from that at which the tightening means is located and in close proximity to the rod when said polished rod grip is in place about the rod, with the gate functioning as the fulcrum point of the lever members which constitute the jaws of the grip and with the polished rod grooves about the rod constituting the point of resistance of the lever members and with the tightening means through which power is applied to the lever members being at a greater distance from the rod than is the aforesaid gate; to also provide an inexpensive handle for the polished rod grip.

With the above and other objects in view which will appear as the description proceeds, my invention consists in the novel features hereinafter set forth in detail, illustrated in the accompanying drawing and more particularly pointed out in the appended claims.

Referring to the drawing in which numerals of like character designate similar parts throughout the several views.

Figure 4:
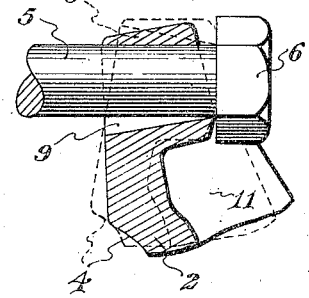

Fig. 4 is a view in cross section of that part of the gripping members through which said bolts are passed, taken on a plane lying transversely of my polished rod grip with respect to the axis in which the polished rod is held by said grip, and showing a partial view of one of said bolts in the aperture of the gripping member through which said bolt is passed. In this figure the section of the gripping member is shown in position with relation to the bolt as if the jaws of the grip were fully opened, and the dotted lines indicate the position assumed by the gripping member with relation to the bolt when the jaws of the grip are clamped on the polished rod.

Figure 1:
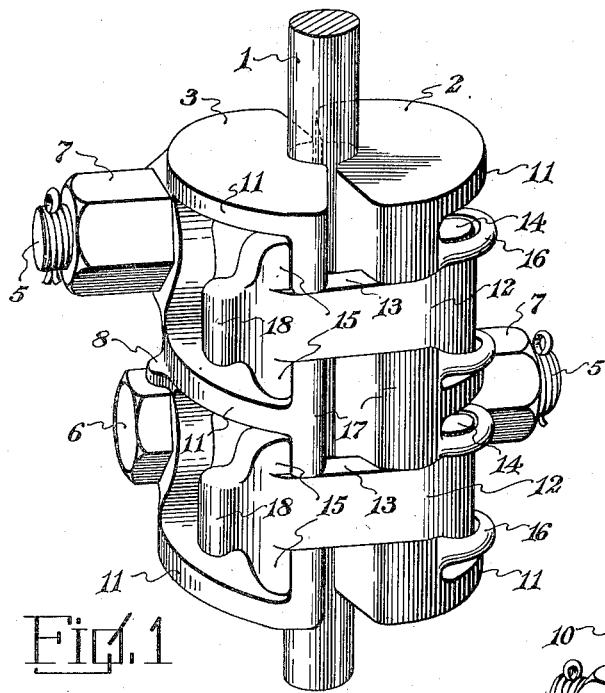
Fig. 1 is a front view in perspective of my polished rod grip, shown in place on and gripping a polished rod, in which view the gate appears in the forefront.
Figure 3:
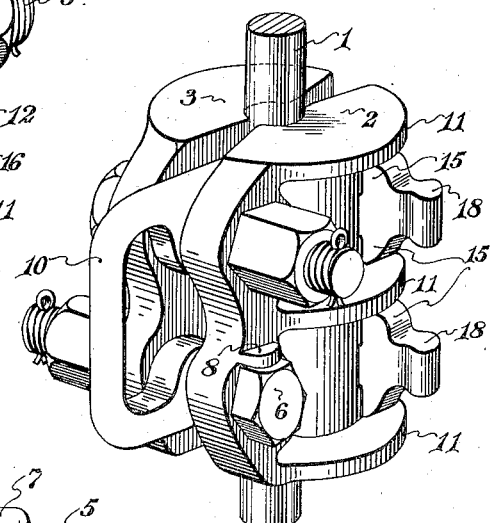
Fig. 3 is a rear view in perspective of my polished rod grip shown in place on and gripping a polished rod, in which view the tightening means, in the form of bolts passed through the gripping members, appear in the forefront.
Figure 2:
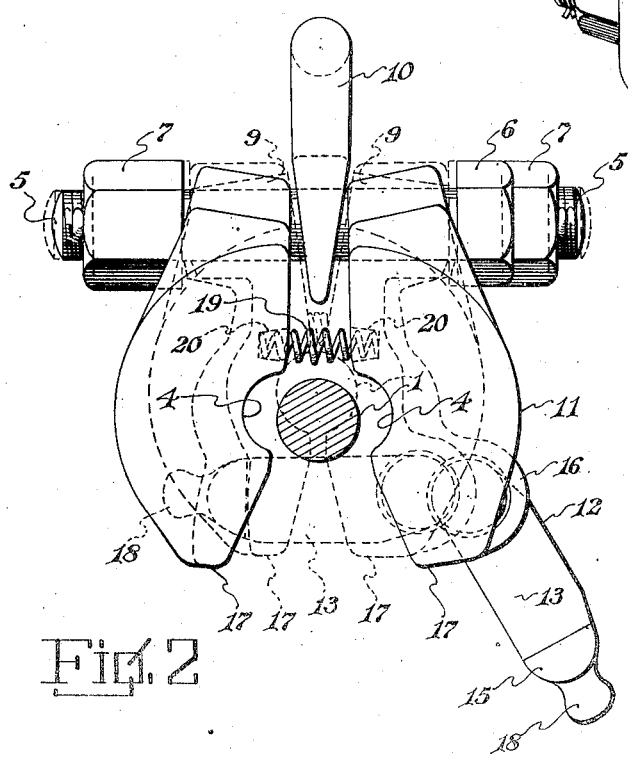
Fig. 2 is a top plan view of the same, except in this view my polished rod grip is shown with its jaws or gripping members fully open, permitting the grip to be removed from or to be placed about the rod. The broken lines indicate the position assumed by the various members when the grip is in place on and gripping the polished rod as in Fig. 1.

1 represents a polished rod. 2 represents one of a pair of gripping members constituting the jaws of my polished rod grip and 3 the other of said gripping members of said pair. 4 represents a polished rod groove longitudinally disposed throughout the body portion of each of said gripping members, and contoured to receive and hold the polished rod, with the groove being less than a full semi-circle in order that the jaws of the grip may not be brought into contact with each other about the rod and thus prevent the full force of the grip being exerted on the rod. 5 represents a bolt or bolts each with a head 6 and a nut 7 thereon, which said bolt or bolts loosely hold the pair of gripping members 2 and 3 together as hereinafter stated. 8 represents a lug on the gripping member which contacts with bolt head 6 to prevent the bolt from turning when the nut is turned. 9 represents an aperture in each of the gripping members 2 and 3 through which bolt 5 is passed. Preferably the apertures 9 in both of the pairs of gripping members 2 and 3 are made sufficiently larger than the bolt or bolts 5, as more particularly appears in Fig. 4, so as to permit the gripping members 2 and 3 to swing on the bolt or bolts 5 to fully open the jaws of the grip when nut or nuts 7 are backed off and the gates are unlatched as shown in Fig. 2; although, if the aperture or apertures 9 in only one of the gripping members were sufficiently enlarged or made in the form of a slot, the mode of operation would be substantially the same, as instead of both gripping members being free to swing on the bolt or bolts 5, the jaws could be opened by swinging only one of the gripping members 2 and 3 on said bolt or bolts. In Fig. 4 the aperture 9 is shown as a tapered hole in the gripping member, the tapering of the hole permitting the gripping member to swing on the bolt. 10 represents a handle for my polished rod grip, which handle is loosely held on bolt or bolts 5 between the gripping members 2 and 3. 11 represents reinforcing flanges on the body portion of said gripping members. 12 represents generally a gate formed of a gate bar 13 on one end of which are gudgeons 14 and at the other end of which are latch-lugs or projections 15. The gudgeons 14 are pivotally held in loops 16 which may be welded on the gripping member to which they are attached. 17 represents a rail along the front edge of each of the gripping members 2 and 3, with the rail recessed or notched to receive the gate bar 13, thus forming lugs on said gripping members on either side of and in proximity to the gate bar 13 and against which lugs the gudgeons 14 and the latch-lugs 15 may bear to function as fulcrums of the gripping members 2 and 3 when the same are clamped about the polished rod. The gate 12 has thereon a thumb plate projection 18 for conveniently unlatching the gate. 19 represents a compression spring or springs held in a recess or recesses 20 in each of the gripping members 2 and 3, and normally urging said members apart, to the effect that when the tightening means or bolt or bolts 5 are sufficiently loosened and the gate or gates 12 are unlatched the jaws of the grip will automatically open, as shown in Fig. 2. This spring is located on the gripping member between the polished rod grooves 4 and the bolts 5, so as not to obstruct the entrance of the rod into the jaws of the grip.

The drawing discloses a polished rod grip having a two gate locking means and a two bolt tightening means on the pair of gripping members. However, the polished rod grip may be made with the gripping members equipped with any desired number of said parts, and a single bolt and gate structure will function in the same manner as a multiple bolt and gate grip.

The structure of the polished rod grip is such that the gripping members 2 and 3 are levers loosely assembled on bolt or bolts 5 which serve as a hinge whereon the gripping members may swing to open and to close the jaws of the grip. In operation, however, the bolts serve not as a hinge for the gripping members but as the tightening means of the clamp, that is the members through which power is applied to the lever members, and the gates serve as the hinge or fulcrum of the gripping or lever members, with the polished rod being the resistance point of the levers.

When the nuts 7 on bolts 5 are backed away from the gripping members 2 and 3, that is, when the nuts are threaded back for a sufficient distance on the bolts, the spring 19 automatically urges the gripping members apart when the gates 12 are unlatched, and the gripping members are swung on said bolts so that the jaws of the grip have sufficient clearance between them to insert or remove the polished rod into or from the polished rod grooves 4 in said gripping members. When the polished rod grip is to be tightened on the polished rod, the grip is placed so that the polished rod grooves 4 will embrace the rod, whereupon the gates 12 are swung closed and latched, thus holding the front part of the two gripping members together. The nuts 7 are then tightened on bolts 5, thus applying pressure on the rod 1 through the gripping members 2 and 3, to clamp said polished rod grip on the rod.

Preferably the inner plane surfaces of the gripping members 2 and 3 are disposed at an angle to each other, the surfaces diverging radially of the axis of the polished rod groove as shown in the drawing, which form of construction, together with sufficiently enlarged apertures 9 for the bolts, insures adequate clearance between the gripping members for the insertion and withdrawal of the polished rod and for tightening the grip on the rod, without moving the nut on bolts 5 any considerable distance. It is preferred to locate the polished rod grooves 4 as closely as possible to the gates 12 when they are latched in place, and to locate the bolts 5 as far as possible away from the polished rod grooves 4, in order to obtain a compound leverage on the gripping members. This is illustrated in Fig. 2 in which the compound leverage appears to be in the ratio of approximately two to one.

Having thus fully disclosed my invention, what I claim and desire to secure by Letters Patent is:

1. A rod grip comprising a pair of rod gripping members having rod receiving channels therein adapted to receive opposite sides of a rod, a connection between said gripping members at one side thereof, said connection comprising bolts extending through transversely elongated apertures in the gripping members, spaced heads carried by the bolts, said heads being spaced at a distance from each other a distance greater than the combined thickness of the portions of the gripping members through which they pass, whereby the gripping members may rockably move to open and closed positions, said bolts forming means whereby the connected ends of the gripping members may be adjusted in relation to each other, spring means interposed between the gripping members and located between the bolts and the channels of the gripping members, and gate means connecting the opposite sides of the gripping members.

2. A device as set forth in claim 1 including a handle member mounted on the bolts between the gripping members and extending outwardly from one side of the gripping members.

3. A rod grip comprising a pair of rod gripping members having rod receiving channels therein adapted to receive opposite sides of a rod, a connection between said gripping members at one side thereof, said connection comprising bolts extending through transversely elongated apertures in the gripping members, spaced heads carried by the bolts, said heads being spaced at a distance from each other a distance greater than the combined thickness of the portions of the gripping members through which they pass, whereby the gripping member may be rockably moved to open and closed positions, said bolts forming means whereby the connected ends of the gripping members may be adjusted in relation to each other, gate means connecting the opposite sides of the gripping members and a handle member mounted on the bolts between the gripping members and extending outwardly from one side of the gripping members.

CHARLES L. DECKARD.